Dec. 26, 1950     H. BACHLI ET AL     2,535,382

HANDLE

Filed April 22, 1949

INVENTORS.
Herman Bachli and
BY Harry S. Shapiro
Clarence E. Threedy
Their Attorney.

Patented Dec. 26, 1950

2,535,382

UNITED STATES PATENT OFFICE 2,535,382

HANDLE

Herman Bachli and Harry S. Shapiro, Chicago, Ill., assignors to Chicago Specialty Mfg. Co. Inc., Chicago, Ill., a corporation of Illinois Application April 22, 1949, Serial No. 89,084

1 Claim. (Cl. 287—53)

Our invention relates to certain new and useful improvements in handles particularly adaptable for mounting upon stems of valves of faucets and other instrumentalities in plumbing installations.

A primary and principal object of our invention is to provide an arrangement structurally characterized in a manner such as to enable the handle to be rigidly secured to the stem of a valve so as to compensate for stems of different diameters and different cross-sectional shapes and designs, with equal effectiveness, all while enabling the handle to be readily applied to any stem within a predetermined range of sizes conventionally met in practice.

Another and equally important object of the invention is to provide a simplified handle construction of the character hereinafter described, one comprising relatively few parts, affording economical manufacture.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
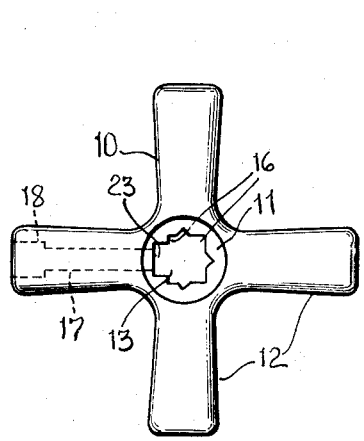
Fig. 1 is a bottom plan view of a handle embodying the invention, with the securing means removed therefrom.
Figure 3:
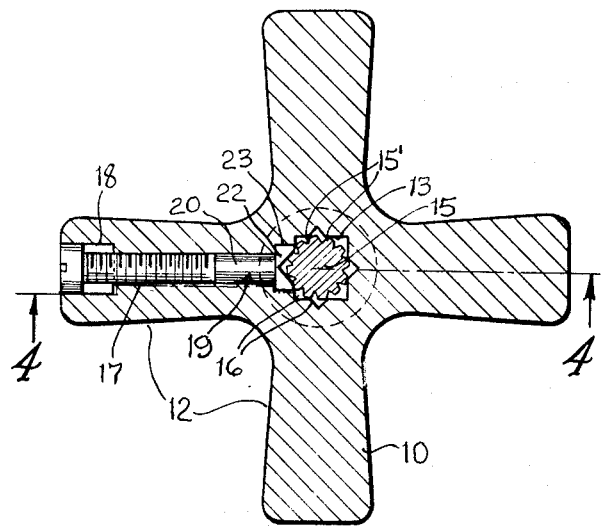
Fig. 3 is a sectional detail view taken substantially on line 3—3 of Fig. 4.
Figure 2:
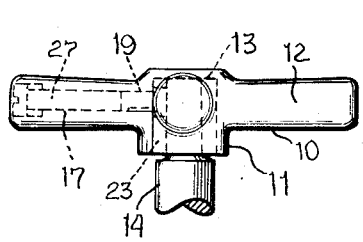
Fig. 2 is a side view showing the handle structure embodying our invention mounted upon a valve stem.
Figure 4:
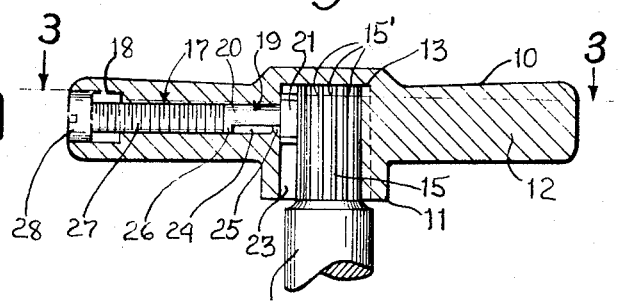
Fig. 4 is a sectional detail view taken substantially on line 4—4 of Fig. 3.
Figure 5:
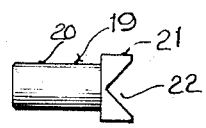
Fig. 5 is a plan view of the wedge block embodying our invention.
Figure 6:
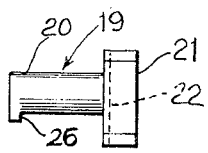
Fig. 6 is a side elevational view of the same.
Figure 7:
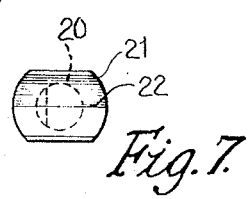
Fig. 7 is an end elevational view of the same.

Our improved valve handle may be secured to the shaft or stem of valves of different sizes within a predetermined range and shape. In this connection the handle is indicated at 10. This handle may be formed of any suitable material and is usually provided with a hub 11 from which radially extend one or more arms 12. The hub 11 is provided with a centrally located socket 13 which receives the stud 15 of the shaft or stem 14. This stud 15 is usually of cylindrical formation with its cylindrical surfaces provided with longitudinally extending ribs 15' to increase the grip between the stud 15 and the handle 10. The central socket 13 is provided with one or more indentations 16 into which the ribs 15' of the stud 15 are to be wedged.

Formed in one of the arms 12 is a longitudinally extending bore 17, the inner end of which communicates with the socket 13 of the hub 11. The outer end of this bore 17 terminates in an enlarged recess 18.

A wedge block 19 is provided with a shank 20 adapted for insertion into the bore 17. This shank 20 provides a head 21 having formed in its outer face a V-shaped groove 22 into which projects an adjacent rib or ribs of the ribs 15'. This head 21 fits into a recess 23 formed in the hub 11 at the inner terminal of the bore 17.

A portion of the shank 20 is cut away to provide a groove 24 into which a stop lug 25, struck from the hub 11 projects. A complementary lug 26 on the shank 20 is adapted to cooperate with the lug 25 to prevent displacement of the wedge block when the handle is removed from the stud 15 and prior to mounting of the handle on the stud 15.

A wedging screw 27 is threaded into the bore 17 against the shank 20 whereby to wedge the head 21 against the ribbed stud 15. The head 28 of this wedging screw projects into the countersink 18. Once the wedge block 19 is mounted in the bore 17, it cannot be displaced therefrom, it being pointed out that the formation of the stop lug 25 is formed after the wedge block 19 is mounted in the bore 17.

While we have shown the stud 15 as being ribbed, it is manifest that the cylindrical surfaces of this stud may be uninterrupted and smooth. In such case the handle will be as equally firmly and rigidly secured to the smooth stem or stud by the wedge block 19.

From the foregoing description, it is apparent that we have provided a handle structure which may be mounted upon stems of different sizes within a predetermined range and shape; that such handle structure is simplified, in that it comprises relatively few parts, thereby enabling us to manufacture the same at an economical cost.

In the event that the stud 15 is of square formation in cross section, the corners of the stud will engage into the indentations 16 as well as the groove 22 of the wedge block 19 and, when thus engaged, the handle 10 will be prevented from rotating relative to the stem. This enables us to provide a more rigid connection between the handle and the stem.

While we have illustrated and described the preferred form of construction for carrying our invention into effect, this is capable of variation and modification without departing from the spirit of invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

For a combination comprising a handle having a central hub and a plurality of arms radially extending from said hub with one of said arms provided with a tapered bore, the hub of said handle being provided with a socket communicating with the inner end portion of the bore, a wedge block having a shank slidably arranged in the inner end portion of the bore and provided with an enlarged head having a V-shaped groove formed therein, said shank being provided with a groove extending longitudinally of the long axis of the shank, said shank providing at one end of said groove a stop lug, a complementary stop lug provided by said hub and extending into the groove of the shank, and a clamping bolt threaded into said bore into bearing engagement with respect to said shank.

HERMAN BACHLI.
HARRY S. SHAPIRO.

REFERENCES CITED

The following references are of record in the file of this patent:

UNITED STATES PATENTS

| Number | Name | Date |
|---|---|---|
| 954,763 | Richards | Apr. 12, 1910 |
| 1,145,587 | Hitchcock | July 6, 1915 |